(12) United States Patent
McLaughlin et al.

(10) Patent No.: US 8,996,710 B2
(45) Date of Patent: Mar. 31, 2015

(54) SYSTEMS AND METHODS FOR PEER-TO-PEER CONTROL USING AN INPUT/OUTPUT NETWORK

(75) Inventors: Paul F. McLaughlin, Ambler, PA (US); Kamel Zerdoum, Chalfont, PA (US); Angela Lordi, Landsdale, PA (US)

(73) Assignee: Honeywell International Inc., Morristown, NJ (US)

( * ) Notice: Subject to any disclaimer, the term of this patent is extended or adjusted under 35 U.S.C. 154(b) by 1124 days.

(21) Appl. No.: 12/098,943

(22) Filed: Apr. 7, 2008

(65) Prior Publication Data
US 2009/0254197 A1   Oct. 8, 2009

(51) Int. Cl.
*G06F 15/16*   (2006.01)
*G05B 19/418*   (2006.01)

(52) U.S. Cl.
CPC .. *G05B 19/4186* (2013.01); *G05B 2219/31369* (2013.01)
USPC ........................................................ 709/230

(58) Field of Classification Search
USPC .......... 709/220, 223, 230; 710/7, 63; 713/375
See application file for complete search history.

(56) References Cited

U.S. PATENT DOCUMENTS

| | | | |
|---|---|---|---|
| 4,084,235 A * | 4/1978 | Hirtle et al. ..................... 703/26 |
| 5,887,029 A * | 3/1999 | Husted et al. ................. 375/224 |
| 6,591,311 B1 * | 7/2003 | Blech et al. ....................... 710/7 |
| 6,845,410 B1 * | 1/2005 | Brown et al. ................... 710/29 |
| 7,147,164 B1 * | 12/2006 | Burma ...................... 235/472.02 |
| 2004/0210664 A1 * | 10/2004 | Prendergast ................. 709/230 |
| 2006/0125322 A1 * | 6/2006 | Foard ............................. 307/112 |
| 2006/0294047 A1 * | 12/2006 | Johnston et al. .................. 707/1 |
| 2007/0083275 A1 * | 4/2007 | Law et al. ........................ 700/19 |
| 2007/0208439 A1 * | 9/2007 | Driskill et al. ................... 700/86 |
| 2008/0015714 A1 * | 1/2008 | Rudnick et al. ................. 700/52 |
| 2008/0046227 A1 * | 2/2008 | Flamingo ........................ 703/28 |
| 2008/0240136 A1 * | 10/2008 | Motosugi ..................... 370/402 |
| 2009/0070504 A1 * | 3/2009 | Kostadinov .................. 710/105 |
| 2009/0089031 A1 * | 4/2009 | Sturrock et al. .................. 703/7 |
| 2009/0193029 A1 * | 7/2009 | Govindaraj et al. ........... 707/10 |
| 2009/0243815 A1 * | 10/2009 | Tolli ......................... 340/310.11 |
| 2010/0016994 A1 * | 1/2010 | Hansen et al. .................... 700/9 |

* cited by examiner

*Primary Examiner* — Jason Recek
(74) *Attorney, Agent, or Firm* — Jetter & Associates, P.A.

(57) ABSTRACT

System (200) and method (400) for enabling peer-to-peer communications between controllers ($204_1, \ldots, 204_N$, $222_1, \ldots, 222_N$) of at least two control systems (202, 218). The system (200) include a first control system (FCS) having a first controller (FC) communicatively coupled to a first input/output (I/O) processing module ($212_1, \ldots, 212_N$) via a first I/O network ($214_1, \ldots, 214_N$). The first I/O processing module is communicatively coupled to first automation equipment (216). The second control system (SCS) includes a second controller (SC) communicatively coupled to the FC via the first I/O network. The first I/O network provides peer-to-peer communications between the FC and SC. The SC is configured to emulate the first I/O processing module. More particularly, the SC is configured to match an internal I/O configuration with an I/O configuration of the FC.

2 Claims, 5 Drawing Sheets

SYSTEMS AND METHODS FOR PEER-TO-PEER CONTROL USING AN INPUT/OUTPUT NETWORK

BACKGROUND OF THE INVENTION

1. Statement of the Technical Field

The invention concerns control systems and methods for peer-to-peer control signal communications between controllers of at least two control systems (e.g., first and subsequent generation control systems) using an input/output (I/O) network of one of the control systems.

2. Background

Entities employing automation processes typically adopt automation process equipment and use the automation process equipment for many decades. This "conservative" aspect of the automation process industry is due to the significant expense incurred in setting up automation process equipment. In effect, a Process Automation System (PAS) typically contains at least two types of automation process equipment. The types of automation process equipment can include, but are not limited to, first generation automation process equipment and second (or subsequent) generation automation process equipment. Such a conventional PAS including first and second generation automation process equipment is shown in FIG. 1.

As shown in FIG. 1, the conventional PAS 100 includes at least one operator computer system 108, a first generation control system 102, a subsequent generation control system 118, and industrial equipment 116, 126. The first generation control system 102 is comprised of controllers $104_1, \ldots, 104_N$, input/output (I/O) networks $114_1, \ldots, 114_N$, and I/O processing modules (PMs) $112_1, \ldots, 112_N$. The I/O networks $114_1, \ldots, 114_N$ are often Universal Asynchronous Receiver-Transmitter (UART) based networks. UART based networks are well known to those having ordinary skill in the art, and therefore will not be described herein. Likewise, the subsequent generation control system 118 is comprised of controllers $122_1, \ldots, 122_N$, I/O networks $128_1, \ldots, 128_N$, and I/O processing modules (PMs) $124_1, \ldots, 124_N$. The I/O networks $128_1, \ldots, 128_N$ are often a Foundation Fieldbus® (FF) based networks. FF based networks are well known to those having ordinary skill in the art, and therefore will not be described herein.

The controllers $104_1, \ldots, 104_N, 122_1, \ldots, 122_N$ are configured to manipulate respective industrial equipment 116, 126. The industrial equipment 116, 126 can include, but is not limited to, motors, pumps, gauges, valves, transmitters, actuators, boilers, distiller units, and sensors. In this regard, it should be understood that each of the controllers $104_1, \ldots, 104_N, 122_1, \ldots, 122_N$ is communicatively coupled to the industrial equipment 116, 126 via a respective I/O network $114_1, \ldots, 114_N, 128_1, \ldots, 128_N$ and respective I/O PMs $112_1, \ldots, 112_N, 124_1, \ldots, 124_N$. The phrase "I/O network" as used herein refers to a communications link between controllers and I/O PMs. The phrase "I/O processing module (or PM)" as used herein refers to an electronic device having digital and analog input and output terminals to which field signals are wired. Accordingly, each of the controllers $104_1, \ldots, 104_N, 122_1, \ldots, 122_N$ is communicatively coupled to the I/O PMs $112_1, \ldots, 112_N, 124_1, \ldots, 124_N$ via the respective I/O network $114_1, \ldots, 114_N, 128_1, \ldots, 128_N$.

The I/O PMs $112_1, \ldots, 112_N, 124_1, \ldots, 124_N$ are configured to facilitate the transferring of data between the controllers $104_1, \ldots, 104_N, 122_1, \ldots, 122_N$ and the respective industrial equipment 116, 126. The I/O PMs $112_1, \ldots, 112_N, 124_1, \ldots, 124_N$ are also configured to process received data signals to place the same in a form suitable for use by a human and/or controller $104_1, \ldots, 104_N, 122_1, \ldots, 122_N$. For example, if an I/O PM $112_1$ receives a four-to-twenty milliamp analog signal representing a temperature of a liquid contained in a tank, then the I/O PM $112_1$ converts the analog signal into useful data such as (1,000 degrees Celsius).

Each of the controllers $104_1, \ldots, 104_N$ of the first generation control system 102 is communicatively coupled to the operator control system 108 and other controllers $104_1, \ldots, 104_N$ via a common communications network 106. The common communications network 106 is typically a Universal Control Network (UCN). UCNs are well known to those having ordinary skill in the art, and therefore will not be described herein. The controllers $104_1, \ldots, 104_N$ are coupled to each other via the common communications network 106 so that they can communicate process parameter information to each other. Such process parameter information typically includes temperature parameters, timing parameters, and liquid level parameters. This exchange of process parameter information is necessary for controlling an industrial process and equipment 116 in accordance with a particular control strategy.

Similarly, each of the controllers $122_1, \ldots, 122_N$ of the subsequent generation control system 118 is communicatively coupled to the operator control system 108 and other controllers $122_1, \ldots, 122_N$ via a common communications network 120. The common communications network 120 is typically an Ethernet Network. Ethernet Networks are well known to those having ordinary skill in the art, and therefore will not be described herein. The controllers $122_1, \ldots, 122_N$ are coupled to each other via the common communications network 120 so that they can communicate process parameter information to each other. This exchange of process parameter information is necessary for properly controlling an industrial process and equipment 126.

Despite the cost saving advantage of a conventional PAS 100, it suffers from certain operational drawbacks. For example, the controllers $104_1, \ldots, 104_N$ of the first generation control system 102 can not communicate process parameter information to the controllers $122_1, \ldots, 122_N$ of the subsequent generation control system 118, and vise versa. One can appreciate that this inability to exchange process parameter information between the first generation controllers $104_1, \ldots, 104_N$ and subsequent generation controllers $122_1, \ldots, 122_N$ limits the integration of first generation and subsequent generation control equipment.

As such, there remains a need for an improved PAS that implements a cost effective approach for enabling communications between controllers of first generation and subsequent generation control systems.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention relates to systems and methods for enabling peer-to-peer communications between controllers of at least two automation process control systems. The methods involve communicatively connecting a first controller of a first control system and a second controller of a second control system using a first input/output (I/O) network. The first I/O network connection facilitates peer-to-peer control signal communications between the first and second controllers. This peer-to-peer control signal communications is achieved by emulating at least one first I/O PM of the first control system at the second controller.

BRIEF DESCRIPTION OF THE DRAWINGS

Embodiments will be described with reference to the following drawing figures, in which like numerals represent like items throughout the figures, and in which.

DETAILED DESCRIPTION

The invention concerns systems and methods for enabling peer-to-peer communications between controllers of at least two control systems. The methods generally involve using a first input/output (I/O) network for peer-to-peer control signal communications between first controllers of the first control system and second controllers of a second control system. The phrase "control signal communications" as used herein refers to a communication sent from a controller of a first control system to a controller of a second control system, wherein the communication includes data needed by the controller of the second control system to control automated equipment in accordance with a particular control strategy. Notably, hardware and/or software implementations of methods according to embodiments of the invention do not generally require changes to a first control system, a first controller, or an intermediary device. Instead, the second controller of the second control system adapts to a first controller's I/O network protocol and physical characteristics.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing the systems and methods of the present invention, it will be helpful in understanding an exemplary environment in which the invention can be utilized. In this regard, it should be understood that the methods of the present invention can be utilized in any application where equipment is to be automatively controlled. Such applications include, but are not limited to, process automation applications (e.g., an industrial plant control applications), medical applications, security applications, and navigation applications. Accordingly, the method of the present invention will now be described in relation to one such application, namely, the process automation applications (e.g., an industrial plant control application).

Figure 1:
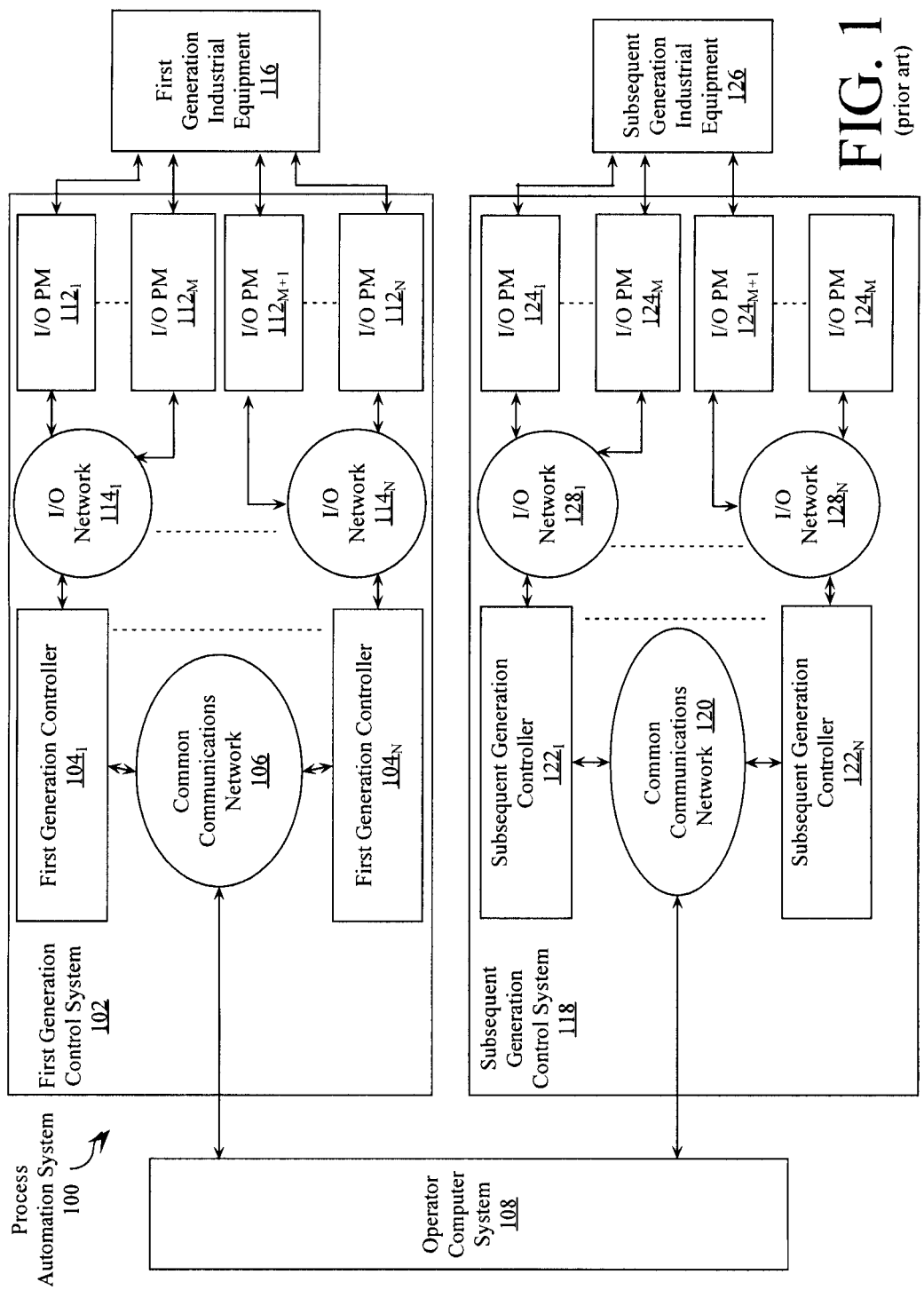
FIG. 1 is a block diagram of a conventional Process Automation System (PAS) having two types of control systems, namely a first generation control system and a second generation control system.
Figure 2:
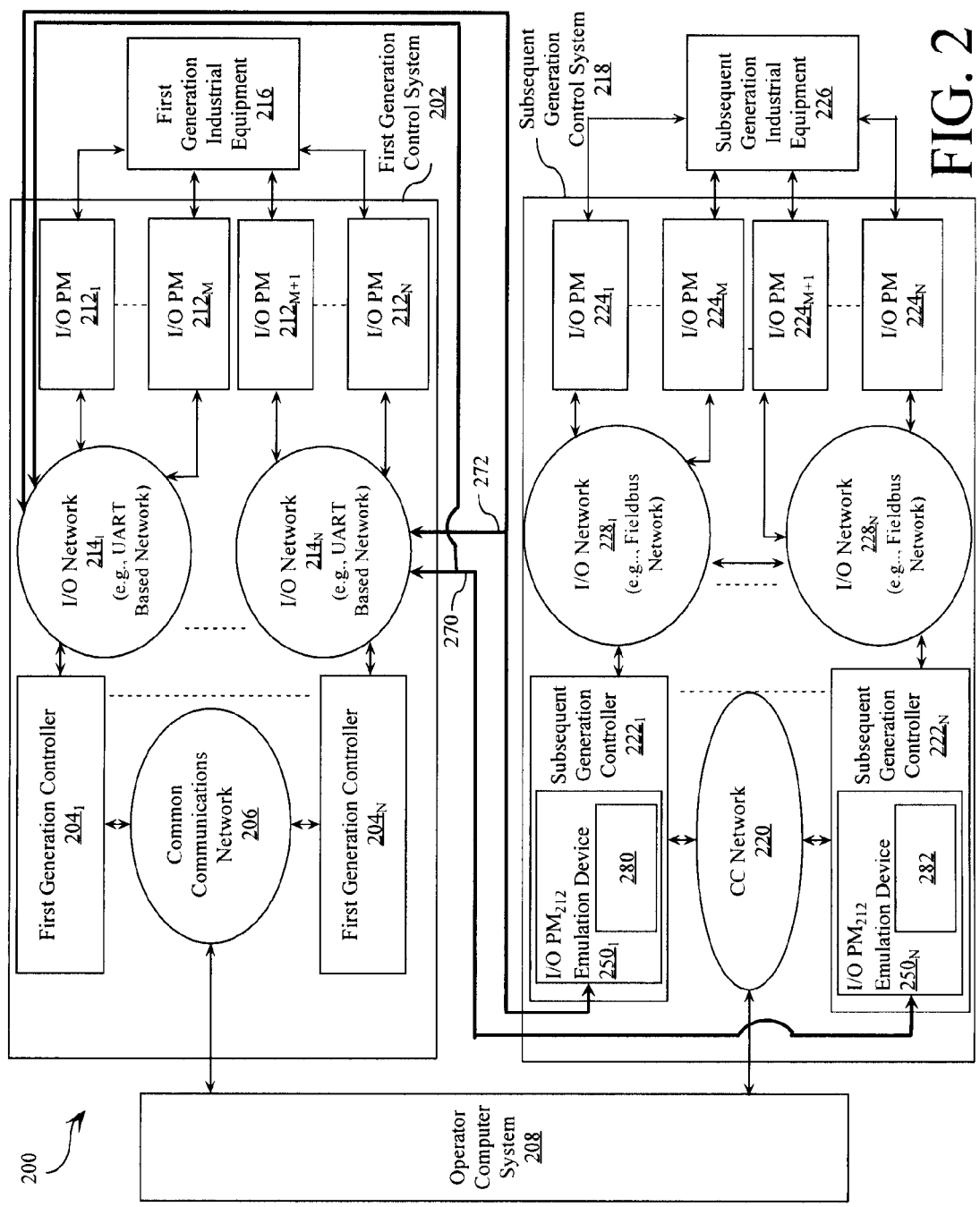
FIG. 2 is a bock diagram of an exemplary embodiment of a Process Automation System (PAS) having two types of control systems, namely a first generation control system and a subsequent generation control system.

Referring now to FIG. 2, there is provided a block diagram of an exemplary embodiment of a Process Automation System (PAS) 200 having two types of control systems, namely a first generation control system (FGCS) 202 and a subsequent generation control system (SGCS) 218. Although the present invention will be described in relation to a first and subsequent generation control system, the invention is not limited in this regard. For example, the present invention can also be applied to PASs comprising two or more control systems of the same generation (e.g., at least two first generation control systems or at least two subsequent generation control systems).

As shown in FIG. 2, the PAS 200 is also comprised of an operator computer system 208 and industrial equipment 216, 226. The industrial equipment 216, 226 can include, but is not limited to, motors, pumps, gauges, valves, transmitters, actuators, boilers, distiller units, and sensors.

It should be understood that the phrase "first generation control system" as used herein refers to a version of a control system created prior to a subsequent generation control system. The phrase "subsequent generation control system" as used herein refers to an $N^{th}$ version of a control system (a) created subsequent to a first generation control system, (b) employs a common communications network different from a common communication network of the first generation control system, and (c) employs an I/O network different from an I/O network of the first generation control system. The common communications networks of the first and subsequent generation control systems will be described in detail below. Similarly, the I/O networks of the first and subsequent generation control systems will be described in detail below.

Referring again to FIG. 2, the FGCS 202 is comprised of first generation controllers $204_1, \ldots, 204_N$, first generation input/output (I/O) networks $214_1, \ldots, 214_N$, first generation I/O processing modules (PMs) $212_1, \ldots, 212_N$, and a common communications network 206. The common communications network can be, but is not limited to, a Universal Control Network (UCN). UCNs are well known to those having ordinary skill in the art, and therefore will not be described herein.

The first generation controllers $204_1, \ldots, 204_N$ are comprised of hardware and/or software configured to manipulate first generation industrial equipment 216. The phrase "first generation industrial equipment" as used herein refers to analog electrical devices typically connected to external devices that typically use a 4-20 mA communications standard. In contrast, the phrase "subsequent generation industrial equipment" as used herein refers to digital microprocessor driven devices that typically use digital forms of integration (e.g., Foundation Fieldbus® and HART®) and diagnostic capture/reporting for asset management.

As shown in FIG. 2, each of the first generation controllers $204_1, \ldots, 204_N$ is communicatively coupled to the first generation industrial equipment 216 via a respective I/O network $214_1, \ldots, 214_N$ and I/O PMs $212_1, \ldots, 212_N$. The phrase "I/O network" as used herein refers to a communications link between controllers and I/O PMs. The phrase "I/O processing module (or PM)" as used herein refers to an electronic device (a) having digital/analog input/output terminals to which field signals are wired and (b) providing an interface between controllers and industrial equipment. Accordingly, each of the first generation controllers $204_1, \ldots, 204_N$ is communicatively coupled to the first generation I/O PMs $212_1, \ldots, 212_N$ via a respective first generation I/O network $214_1, \ldots, 214_N$.

The first generation I/O PMs $212_1, \ldots, 212_N$ are configured to facilitate the transferring of data between the first generation controllers $204_1, \ldots, 204_N$ and the first generation industrial equipment 216. In this regard, it should be understood that the first generation I/O PMs $212_1, \ldots, 212_N$ can employ a conventional first generation I/O network data messaging format. A schematic illustration of a conventional first generation I/O network data messaging format is provided in FIG. 3.

Figure 3:
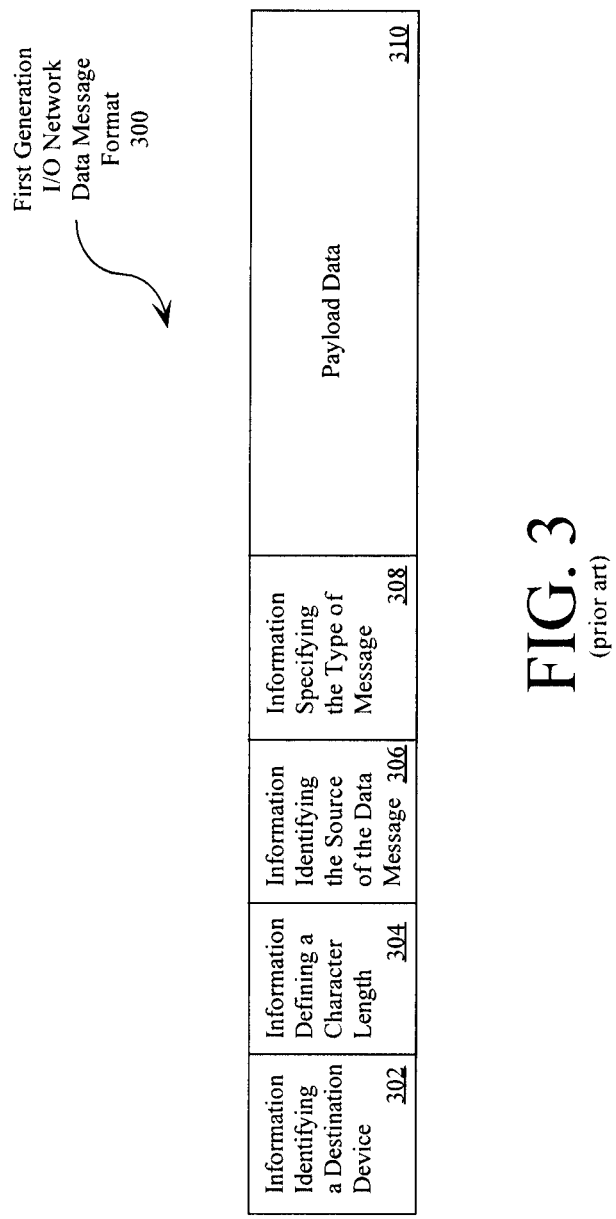
FIG. 3 is a schematic illustration of a conventional first generation I/O network data message format.

As shown in FIG. 3, the conventional first generation I/O network data messaging format 300 includes a plurality of data segments 302, ..., 310. The data segment 302 includes information identifying a destination device (e.g., identifier of a controller $204_1$). The data segment 304 includes information defining a character length. The data segment 306 includes information identifying a source of a data message (e.g., identifier of a controller $204_N$). The data segment 308 includes information specifying the type of message. The data segment 310 includes payload data. The payload data can include process parameter information, control information, or any other information necessary to control an industrial process or equipment 216, 226 in accordance with a particular control strategy. The invention is not limited in this regard. The first generation I/O network data messaging format can be selected in accordance with a particular first generation I/O network $214_1, \ldots, 214_N$ application.

Referring again to FIG. 2, the first generation I/O PMs $212_1, \ldots, 212_N$ are also configured to process analog and digital signals received from first generation industrial equipment 216. This signal processing is performed to convert data contained in the received signal into a form suitable for use by a human operator (not shown) and/or a first generation controller $204_1, \ldots, 204_N$. For example, if a first generation I/O PM $212_1$ receives a four-to-twenty milliamp analog signal representing a temperature of a liquid contained in a tank, then the I/O PM $212_1$ converts the data contained in the analog signal into useful data (such as 1,000 degrees Celsius). The invention is not limited in this regard.

According to an embodiment of the invention, the first generation I/O networks $214_1, \ldots, 214_N$ are Universal Asynchronous Receiver-Transmitter (UART) based networks. In such a scenario, the I/O PMs $212_1, \ldots, 212_N$ are Universal Asynchronous Receiver-Transmitters (UARTs) capable of receiving and sending data without requiring start and stop code. UARTs and UART based networks are well known to those having ordinary skill in the art, and therefore will not be described herein. The invention is not limited in this regard. The first generation I/O networks $214_1, \ldots, 214_N$ and I/O PMs $212_1, \ldots, 212_N$ can be of any type selected in accordance with a particular FGCS 202 application.

Each of the controllers $204_1, \ldots, 204_N$ of the FGCS 202 is communicatively coupled to the operator control system 208 via the common communications network 206 (e.g., a Universal Control Network). Similarly, the controllers $204_1, \ldots, 204_N$ are communicatively coupled to each other via the common communications network 206. The controllers $204_1, \ldots, 204_N$ are coupled to each other via the common communications network 206 so that they can communicate process parameter information and control information to each other. The process parameter information can include, but is not limited to, temperature parameters, timing parameters, and liquid level parameters. The exchange of parameter and control information is necessary for controlling the first generation industrial equipment 216 in accordance with a pre-defined process control strategy.

As shown in FIG. 2, the SGCS 218 is comprised of subsequent generation controllers $222_1, \ldots, 222_N$, subsequent generation I/O networks $228_1, \ldots, 228_N$, subsequent generation I/O PMs $224_1, \ldots, 224_N$, and the common communications 220. The common communications network 220 can be, but is not limited to, an Ethernet Network. Ethernet Networks are well known to those having ordinary skill in the art, and therefore will be described herein. The subsequent generation controllers $222_1, \ldots, 222_N$ are comprised of hardware and/or software configured to manipulate subsequent generation industrial equipment 226. In this regard, it should be understood that each of the controllers $222_1, \ldots, 222_N$ is communicatively coupled to the industrial equipment 226 via a respective I/O network $228_1, \ldots, 228_N$, and I/O PMs $224_1, \ldots, 224_N$.

The I/O PMs $224_1, \ldots, 224_N$ are configured to facilitate the transferring of data between the subsequent generation controllers $222_1, \ldots, 222_N$ and the industrial equipment 226. In this regard, it should be understood that the I/O PMs $224_1, \ldots, 224_N$ can employ a subsequent generation I/O network data messaging format. Such data messaging formats can include, but are not limited to, a Fieldbus data messaging format and an open system interconnection (OSI) data messaging format. These data messaging formats are well known to those having ordinary skill in the art, and therefore will not be described herein. The I/O PMs $224_1, \ldots, 224_N$ are also configured to process analog and digital signals received from industrial equipment 226. This signal processing is performed to convert data contained in the received signals into a form suitable for use by a human operator (not shown) and/or a subsequent generation controller $222_1, \ldots, 222_N$.

According to an embodiment of the invention, the I/O networks $228_1, \ldots, 228_N$ are Fieldbus based networks. In such a scenario, the I/O PMs $224_1, \ldots, 224_N$ employ a Fieldbus messaging format. The invention is not limited in this regard. The I/O networks $228_1, \ldots, 228_N$ and I/O PMs $224_1, \ldots, 224_N$ can be of any type selected in accordance with a particular SGCS 218 application.

Referring again to FIG. 2, each of the controllers $222_1, \ldots, 222_N$ is communicatively coupled to the operator control system 208 via the common communications network 220. Likewise, the controllers $222_1, \ldots, 222_N$ are communicatively coupled to each other via the common communications network 220, the I/O networks $212_1, \ldots, 212_N$, and the I/O networks $228_1, \ldots, 228_N$. The controllers $222_1, \ldots, 222_N$ are coupled to each other via these networks 220, $212_1, \ldots, 212_N, 228_1, \ldots, 228_N$ so that they can communicate process parameter information and control information to each other. The process parameter information can include, but is not limited to, temperature parameters, timing parameters, and liquid level parameters. The exchange of parameter and control information is necessary for properly controlling the industrial equipment 226 in accordance with a particular control strategy.

Notably, each of the subsequent generation controllers $222_1, \ldots, 222_N$ is communicatively coupled to the first generation controllers $204_1, \ldots, 204_N$ via first generation I/O networks $214_1, \ldots, 214_N$, respectively. Notably, the communications path 270 between the first generation controllers $204_1, \ldots, 204_N$ and the subsequent generation controller $222_N$ is a direct communications path absent of intermediary hardware. Similarly, the communications path 272 between the first generation controllers $204_1, \ldots, 204_N$ and the subsequent generation controller $222_1$ is a direct communications path absent of intermediary hardware.

This direct communicative coupling between controllers $204_1, \ldots, 204_N, 222_1, \ldots 222_N$ facilitates the exchange of process parameter and control information between the control systems 202, 218 over the first generation I/O networks $214_1, \ldots, 214_N$. In this regard, it should be understood that each of the subsequent generation controllers $222_1, \ldots, 222_N$ is comprised of an I/O $PM_{212}$ emulation device $250_1, \ldots, 250_N$. The emulation devices $250_1, \ldots, 250_N$ are comprised of hardware and/or software configured to emulate at least one first generation I/O PM $212_1, \ldots, 212_N$. The term "emulate" as used herein refers to the ability of a program or device to imitate the operations of another program or device.

The I/O PM emulation can involve matching an I/O configuration of a subsequent generation controller $222_1, \ldots, 222_N$ to an I/O configuration of at least one first generation controller $204_1, \ldots, 204_N$. The I/O configurations can include, but are not limited to, information identifying the first generation controller $204_1, \ldots, 204_N$, information defining a relationship between the first generation controller $204_1, \ldots, 204_N$ and at least one first generation I/O PM $212_1, \ldots, 212_N$, information defining a data format employed by the first generation controller $204_1, \ldots, 204_N$, information defining an I/O network protocol utilized by the first generation controller $204_1, \ldots, 204_N$, or information defining operational parameters of the first generation controller $204_1, \ldots, 204_N$.

The I/O PM emulation can also involve populating a storage device 280, 282 of a subsequent generation controller $222_1, \ldots, 222_N$ with data that may be needed by the first generation controllers $204_1, \ldots, 204_N$ in a subsequent control process. Notably, the first generation controllers $204_1, \ldots, 204_N$ periodically send requests to the subsequent generation controllers $222_1, \ldots, 222_N$ for data stored in the storage device 280, 282.

The I/O PM emulation can further involve receiving a control signal including a data message from a first generation controller $204_1, \ldots, 204_N$. The data message can include data needed by the subsequent generation controller $222_1, \ldots, 222_N$ for controlling the industrial equipment 226. The data message can also include a request for certain data needed by the first generation controller $204_1, \ldots, 204_N$ to control industrial equipment 216. In such a scenario, the subsequent generation controller $222_1, \ldots, 222_N$ can respond to the request using the data previously stored in it's storage device 280, 282. The storage device can include, but is not limited to, a plurality of registers.

It should be noted that one or both of the control systems 202, 218 can comprise redundant controllers $204_1', \ldots, 204_N', 222_1', \ldots, 222_N'$ (not shown), I/O networks $214_1', \ldots, 214_N'$ (not shown), and I/O PMs $212_1', \ldots, 212_N', 224_1', \ldots 224_N'$ (not shown). In such a scenario, the controllers $204_1, \ldots, 204_N, 222_1, \ldots, 222_N$ and redundant controllers $204_1', \ldots, 204_N', 222_1', \ldots 222_N'$ can be directly connected to each other via the respective first generation I/O networks $214_1, \ldots, 214_N$ and redundant I/O networks $214_1', \ldots, 214_N'$ (not shown).

Figure 4A:
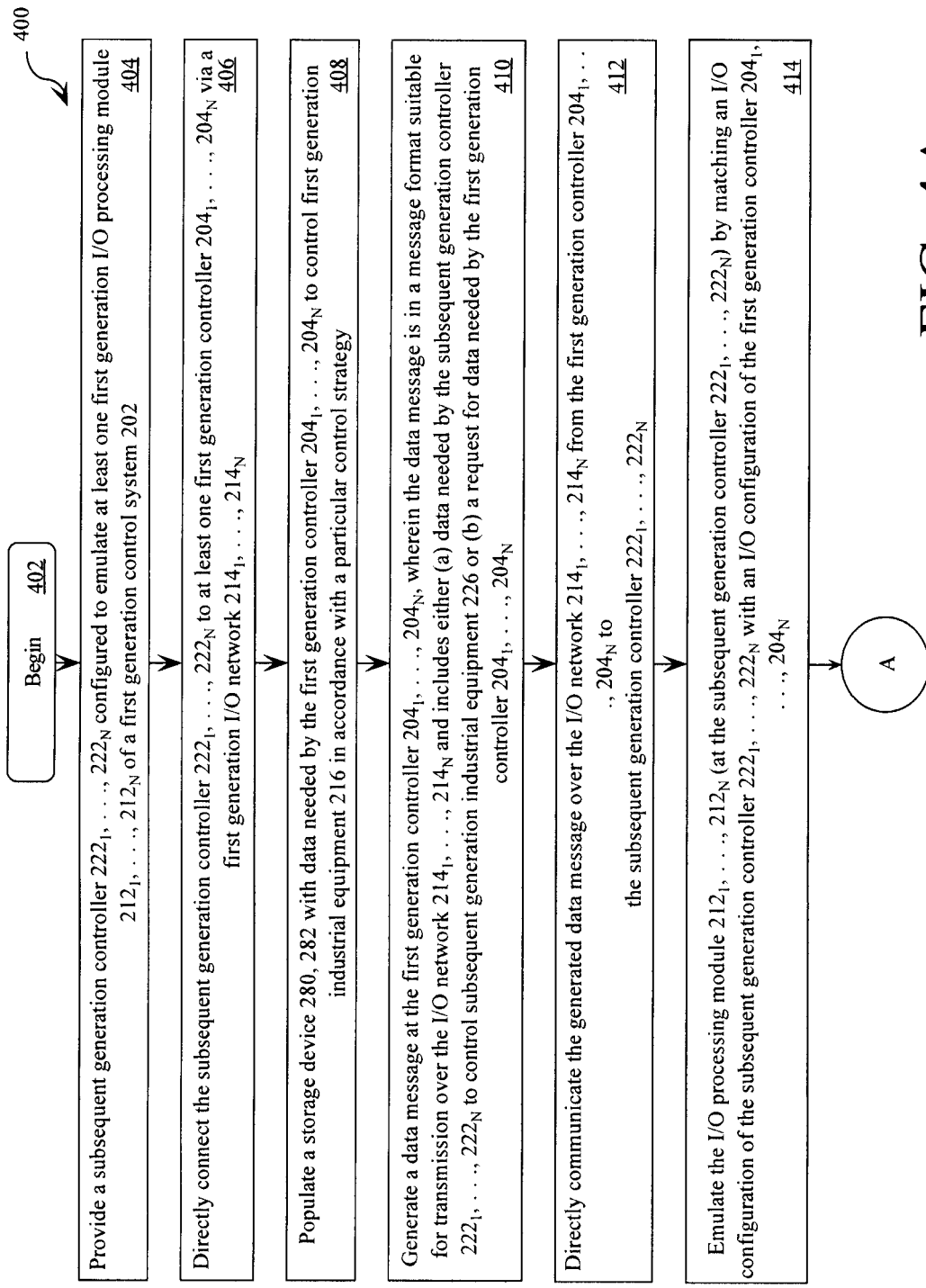
FIGS. 4A-4B collectively provide a flow diagram of a method for enabling peer-to-peer communications between controllers of at least two control systems.
Figure 4B:
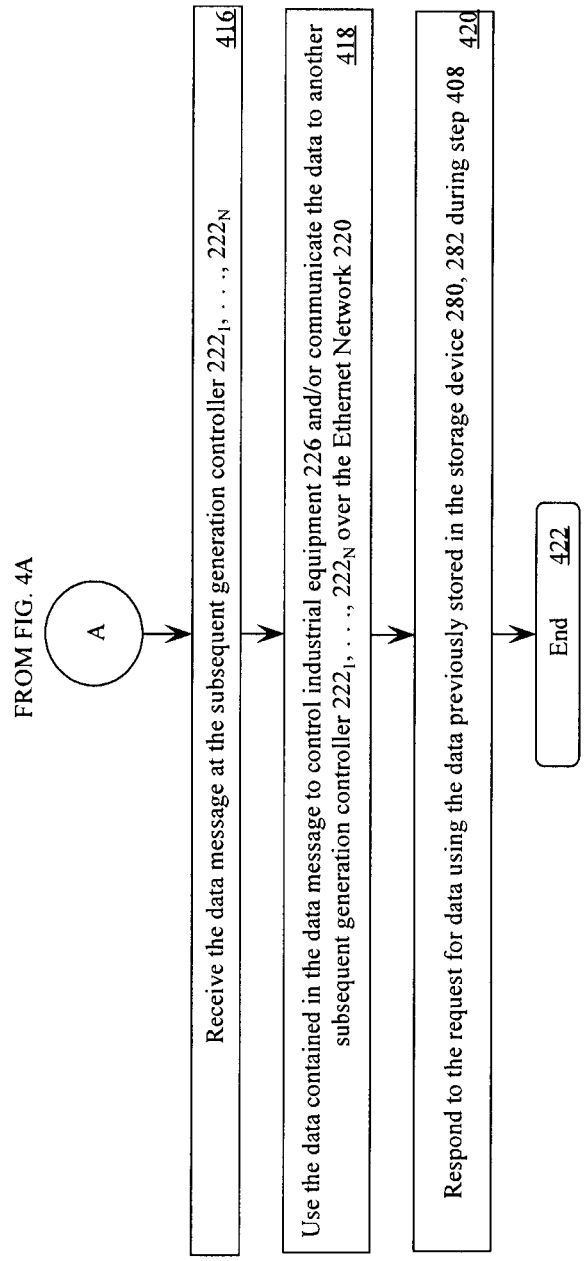

The following FIGS. 4A-4B and accompanying text illustrate a method 400 according to an embodiment to of the invention for enabling peer-to-peer communications between controllers of at least two control systems. It should be appreciated, however, that the method 400 disclosed herein is provided for purposes of illustration only and that the present invention is not limited solely to the method shown.

Referring now to FIG. 4A, the method 400 generally involves using a first generation input/output (I/O) network as a peer-to-peer network for signal communications between controllers of the first generation control system and controllers of a subsequent generation control system. Notably, hardware and/or software implementation of this method does not require changes to first generation control systems, first generation controllers, or intermediary devices. Instead, subsequent generation controllers adapt to a first generation controller's I/O network protocol and physical characteristics.

As shown in FIG. 4A, the method 400 begins at step 402 and continues with step 404. In step 404, a subsequent generation controller $222_1, \ldots, 222_N$ is provided that is capable of emulating at least one first generation I/O PM $212_1, \ldots, 212_N$ of a first generation control system 202. This emulation can be achieved by matching an I/O configuration of the subsequent generation controller $222_1, \ldots, 222_N$ to an I/O configuration of the first generation controller $204_1, \ldots, 204_N$. Subsequent to completing step 404, method 400 continues with step 406. In step 406, the subsequent generation controller $222_1, \ldots, 222_N$ is directly connected to the first generation controller $204_1, \ldots, 204_N$ via a respective first generation I/O network $214_1, \ldots, 214_N$. It should be noted that the communications path 270, 272 provided between the controllers $204_1, \ldots, 204_N, 222_1, \ldots, 222_N$ is absent of intermediary hardware.

After completing step 406, step 408 is performed where the subsequent generation controller $222_1, \ldots, 222_N$ populates a storage device 280, 282 with data that may be needed by the first generation controller $204_1, \ldots, 204_N$ in a subsequent control process. Thereafter, step 410 is performed. In step 410, a data message is generated at the first generation controller $204_1, \ldots, 204_N$. The data message is in a message format suitable for transmission over the first generation I/O network $214_1, \ldots, 214_N$. According to an embodiment of the invention, the data message format is a UART message format (described above in relation to FIG. 3). The invention is not limited in this regard. The data message can include data needed by the subsequent generation controller $222_1, \ldots, 222_N$ for controlling an industrial equipment 226 in accordance with a particular control strategy. The data message can also include a request for data needed by the first generation controller $204_1, \ldots, 204_N$ to control industrial equipment 216.

In step 412, the generated data message is directly communicated from the first generation controller $204_1, \ldots, 204_N$ to the subsequent generation controller $222_1, \ldots, 222_N$ over the first generation I/O network $214_1, \ldots, 214_N$. In step 414, the subsequent generation controller $222_1, \ldots, 222_N$ emulates at least one first generation I/O PM $212_1, \ldots, 212_N$. This emulation is achieved by matching an I/O configuration of the subsequent generation controller $222_1, \ldots, 222_N$ to an I/O configuration of the first generation controller $204_1, \ldots, 204_N$. The I/O configuration can include, but is not limited to, information identifying the first generation controller $204_1, \ldots, 204_N$, information defining a relationship between the first generation controller $204_1, \ldots, 204_N$ and at least one first generation I/O PM $212_1, \ldots, 212_N$, information defining a data format employed by the first generation controller $204_1, \ldots, 204_N$, information defining an I/O network protocol utilized by the first generation controller $204_1, \ldots, 204_N$, or information defining operational parameters of the first generation controller $204_1, \ldots, 204_N$. After step 414, the method 400 continues with a step 416 of FIG. 4B.

Referring now to FIG. 4B, step 416, involves receiving the data message at the subsequent generation controller $222_1, \ldots, 222_N$. After receiving the data message, step 418 and 420 are performed. Step 418 involves using the data contained in the data message to control industrial equipment 226 in accordance with a particular control strategy. Step 418 can also involve communicating the data from the subsequent generation controller $222_1, \ldots, 222_N$ to another subsequent generation controller $222_1, \ldots, 222_N$ via the Ethernet Network 220. In step 420, the subsequent generation controller $222_1, \ldots, 222_N$ responds to the request using the data previously stored in the storage device 280, 282 during step 408. Subsequent to completing step 420, step 422 is performed where the method 400 ends.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for enabling peer-to-peer communications between a first controller in a first control system having a first input/output (I/O) network and a first I/O processing module, said first I/O processing module communicatively coupled to first industrial equipment, and a second controller communicatively coupled to a second I/O processing module via a second I/O network, said second I/O processing module communicatively coupled to second industrial equipment of a second control system, comprising the steps of:

connecting said first controller that employs a first data message format and said second controller that employs a second data message format different from said first data message format using at least one communications path, said second controller comprising a data storage device;

based on I/O configuration data regarding an I/O configuration of said first controller stored in said data storage device, matching an I/O configuration of said second controller to said I/O configuration of the first controller to emulate said first I/O processing module at said second controller, and performing peer-to-peer process parameter and control signal communications between said first and second controllers using said first data message format for communications from said first controller to said second controller and said second data message format for communications from said second controller to said first controller along said communications path during operation of said first and said second industrial equipment;

wherein said second controller receives said first data message format and said first controller receives said second data message format during said peer-to-peer process parameter and control signal communications.

2. An automation process system, comprising:

a first control system comprising at least one first controller employing a first data message format communicatively coupled to a first input/output (I/O) processing module via a first I/O network, said first I/O processing module communicatively coupled to first industrial equipment; and a second control system comprising at least one second controller employing a second data message format different from said first data message format communicatively coupled to a second I/O processing module via a second I/O network, said second I/O processing module communicatively coupled to second industrial equipment, wherein said second controller comprises an I/O processing module emulation device and a data storage device that includes stored information comprising at least one of said first data message format and an I/O network protocol employed by said first controller;

at least one communications path between said first controller and said second controller, wherein said communications path provides peer-to-peer process parameter and control signal communications between said first and second controllers using said first data message format for communications from said first controller to said second controller and said second data message format for communications from said second controller to said first controller during operation of said first and said second industrial equipment;

wherein said second controller receives said first data message format and said first controller receives said second data message format during said peer-to-peer process parameter and control signal communications.

* * * * *